(12) United States Patent
Noh (10) Patent No.: US 8,154,749 B2
(45) Date of Patent: Apr. 10, 2012

(54) IMAGE SIGNAL PROCESSOR AND DEFERRED VERTICAL SYNCHRONOUS SIGNAL OUTPUTTING METHOD

(75) Inventor: Yo-Hwan Noh, Ansan-Si (KR)

(73) Assignee: Mtekvision Co., Ltd., Seoul (KR)

( * ) Notice: Subject to any disclaimer, the term of this patent is extended or adjusted under 35 U.S.C. 154(b) by 973 days.

(21) Appl. No.: 12/092,404

(22) PCT Filed: Oct. 26, 2006

(86) PCT No.: PCT/KR2006/004373
§ 371 (c)(1),
(2), (4) Date: May 1, 2008

(87) PCT Pub. No.: WO2007/052918
PCT Pub. Date: May 10, 2007

(65) Prior Publication Data
US 2008/0291509 A1   Nov. 27, 2008

(30) Foreign Application Priority Data
Nov. 2, 2005 (KR) .................... 10-2005-0104607

(51) Int. Cl.
*G06F 3/12* (2006.01)
*H04N 5/228* (2006.01)

(52) U.S. Cl. .............. 358/1.15; 358/1.6; 348/222.1; 348/521; 348/529

(58) Field of Classification Search .............. None
See application file for complete search history.

(56) References Cited

U.S. PATENT DOCUMENTS

| 7,936,378 B2 * | 5/2011 | Kim ................... 348/222.1 |
| 7,948,527 B2 * | 5/2011 | Kim ................... 348/222.1 |
| 2008/0252740 A1 * | 10/2008 | Kim ................... 348/222.1 |
| 2008/0266415 A1 * | 10/2008 | Noh ................... 348/222.1 |
| 2009/0015701 A1 * | 1/2009 | Noh ................... 348/311 |

FOREIGN PATENT DOCUMENTS

| JP | 5-336489 A | 12/1993 |
| JP | 8-163371 A | 6/1996 |
| WO | WO-2004/043058 A | 5/2004 |

\* cited by examiner

*Primary Examiner* — Dov Popovici
(74) *Attorney, Agent, or Firm* — Birch, Stewart, Kolasch & Birch, LLP (57) ABSTRACT

A method of transferring a deferred vertical synchronous signal and an image signal processor executing the method thereof are disclosed. Once the vertical synchronous signal for a $k^{th}$ frame is inputted from an encoding unit after a capture command is inputted, the method transmits a defer control command for a $(k+1)^{th}$ frame to an image sensor. Then, a return control command is transmitted to the image sensor if encoding of the $k^{th}$ frame is completed. With the present invention, complete encoding of image data becomes possible.

17 Claims, 7 Drawing Sheets

IMAGE SIGNAL PROCESSOR AND DEFERRED VERTICAL SYNCHRONOUS SIGNAL OUTPUTTING METHOD

CROSS-REFERENCE TO RELATED APPLICATIONS

This application claims foreign priority benefits under 35 U.S.C. .sctn. 119(a)-(d) to PCT/KR2006/004373, filed Oct. 26, 2006, which is hereby incorporated by reference in its entirety.

BACKGROUND

1. Technical Field

The present invention is related to data encoding, more specifically to transferring encoded data.

2. Description of the Related Art

By mounting a small or thin imaging device on a small or thin portable terminal, such as a portable phone or a PDA (personal digital assistant), the portable terminal can now function as an imaging device also. Thanks to this new development, the portable terminal, such as the portable phone, can send not only audio information but also visual information. The imaging device has been also mounted on a portable terminal such as the MP3 player, besides the portable phone and PDA. As a result, a variety of portable terminals can now function as an imaging device, capturing an external image and retaining the image as electronic data.

Generally, the imaging device uses a solid state imaging device such as a CCD (charge-couple device) image sensor or a CMOS (complementary metal-oxide semiconductor) image sensor.

Figure 1:
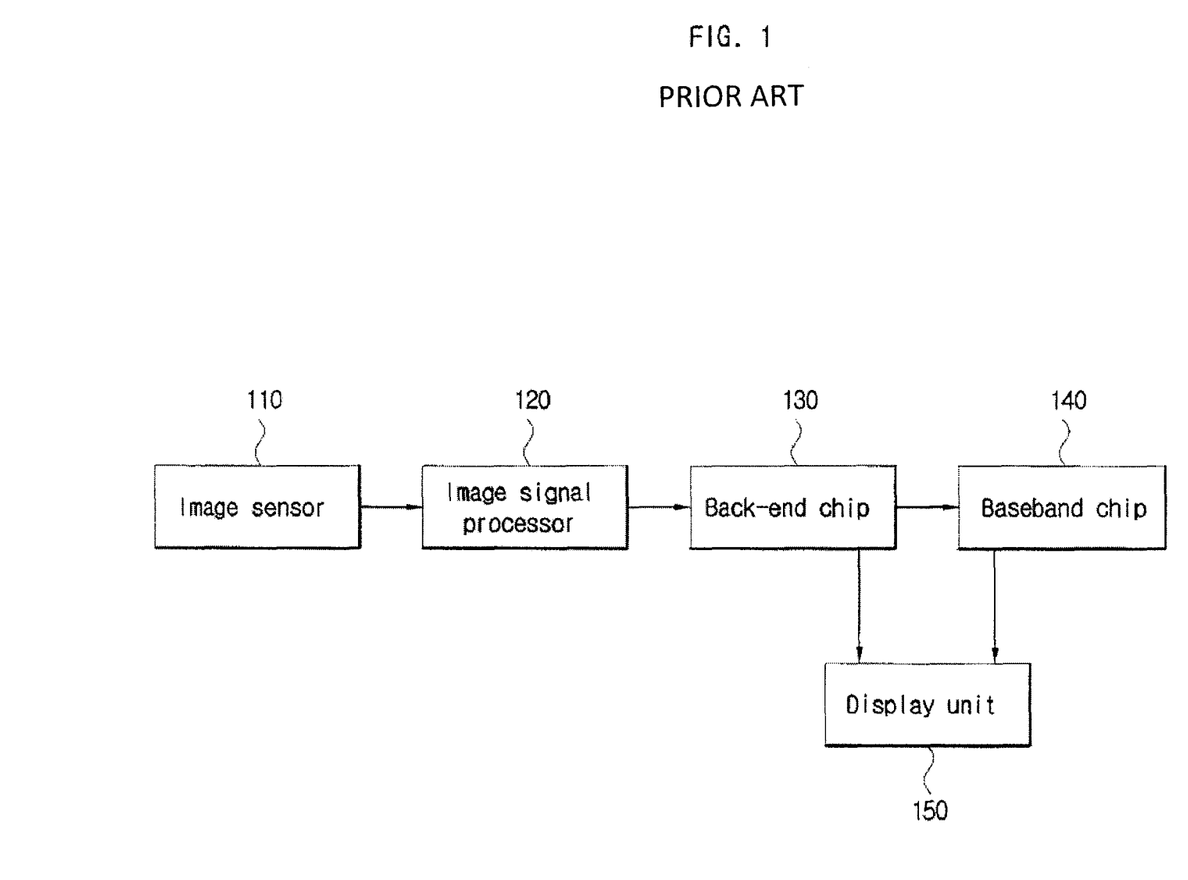
FIG. 1 shows a simple structure of a typical imaging device.
Figure 2:
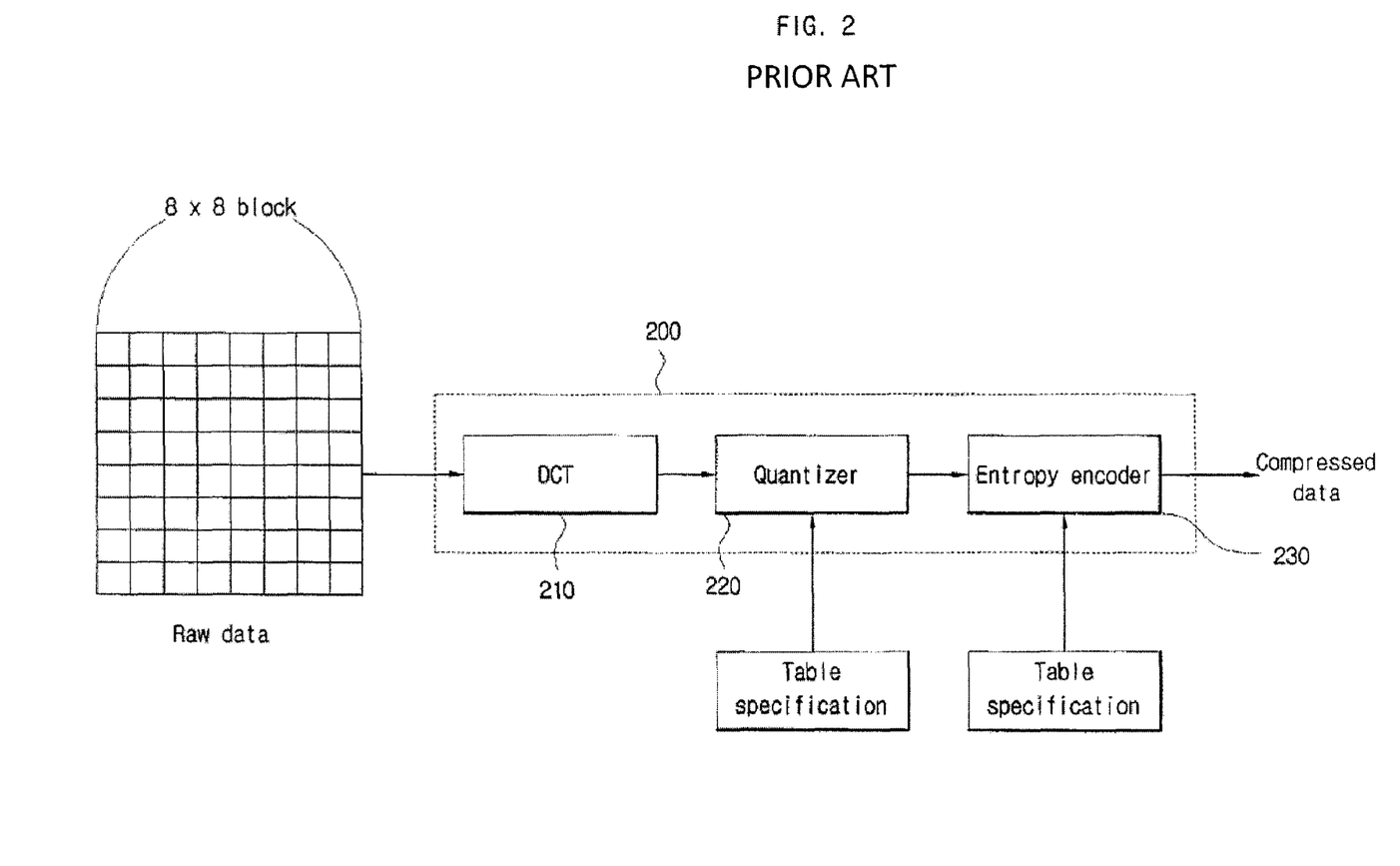
FIG. 2 shows the steps of typical JPEG encoding.
Figure 3:
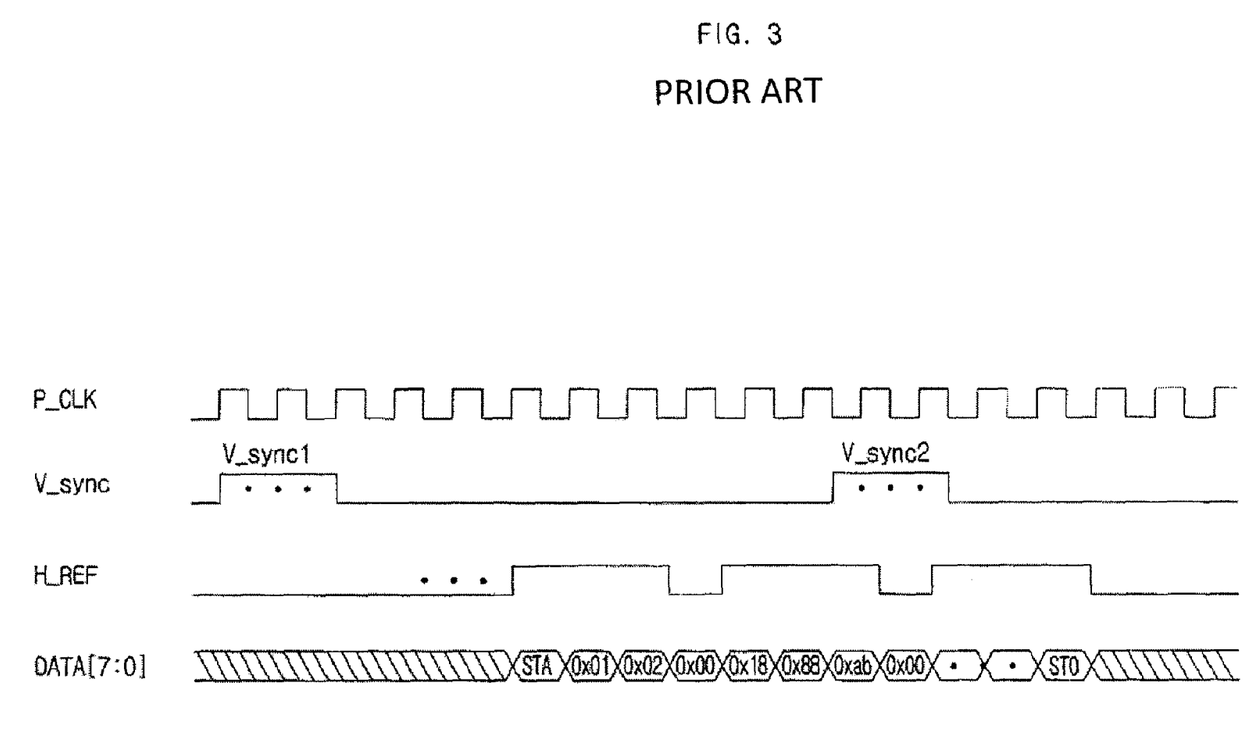
FIG. 3 shows signal types for which a conventional image signal processor outputs encoded data.

FIG. 1 is a simplified structure of a typical imaging device, and FIG. 2 shows the steps of a typical JPEG encoding process. FIG. 3 shows signal types of a related image signal processor (ISP) for outputting encoded data.

As shown in FIG. 1, the imaging device, converting the captured external image to electronic data and displaying the image on a display unit 150, comprises an image sensor 110, an image signal processor (ISP) 120, a back-end chip 130, a baseband chip 140 and a display unit 150. The imaging device can further comprise a memory, for storing the converted electronic data, and an AD converter, converting an analog signal to a digital signal.

The image sensor 110 has a Bayer pattern and outputs an electrical signal, corresponding to the amount of light inputted through a lens, per unit pixel.

The image signal processor 120 converts raw data inputted from the image sensor 110 to a YUV value and outputs the converted YUV value to the back-end chip. Based on the fact that the human eye reacts more sensitively to luminance than to chrominance, the YUV method divides a color into a Y component, which is luminance, and U and V components, which are chrominance. Since the Y component is more sensitive to errors, more bits are coded in the Y component than in the U and V components. A typical Y:U:V ratio is 4:2:2.

By sequentially storing the converted YUV value in FIFO, the image signal processor 120 allows the back-end chip 130 to receive corresponding information.

The back-end chip 130 converts the inputted YUV value to JPEG or BMP through a predetermined encoding method and stores the YUV value in a memory, or decodes the encoded image, stored in the memory, to display on the display unit 150. The back-end chip 130 can also enlarge, reduce or rotate the image. Of course, it is possible, as shown in FIG. 1, that the baseband chip 140 can also receive from the back-end chip 130, and display on the display unit 150 the decoded data.

The baseband chip 140 controls the general operation of the imaging device. For example, once a command to capture an image is received from a user through a key input unit (not shown), the baseband chip 140 can make the back-end chip 130 generate encoded data corresponding to the inputted external image by sending an image generation command to the back-end chip 130.

The display unit 150 displays the decoded data, provided by the control of the back-end chip 130 or the baseband chip 140.

FIG. 2 illustrates the steps of typical JPEG encoding, carried out by the back-end chip 130. Since the JPEG encoding process 200 is well-known to those of ordinary skill in the art, only a brief description will be provided here.

As illustrated in FIG. 2, the image of the inputted YUV values is divided into a block in the size of 8×8 pixels, and in a step represented by 210, DCT (discrete cosine transform) is performed for each block. The pixel value, which is inputted as an 8-bit integer of between −129 and 127, is transformed to a value between −1024 and 1023 by DCT.

Then, in a step represented by 220, a quantizer quantizes a DCT coefficient of each block by applying a weighted value according to the effect on the visual. A table of this weighted value is called a "quantization table." A quantization table value takes a small value near the DC and a high value at a high frequency, keeping the data loss low near the DC and compressing more data at a high frequency.

Then, in a step represented by 230, the final compressed data is generated by an entropy encoder, which is a lossless coder.

The data encoded through the above steps is stored in a memory. The back-end chip decodes the data loaded in the memory and displays the data on the display unit 150.

Signal types during the steps of sequentially inputting the data, stored in the memory, to process, for example, decoding are shown in FIG. 3. Generally, the back-end chip 130 is realized to receive the YUV/Bayer-format data, and the P_CLK, V_sync, H_REF and DATA signals are used as the interface for receiving this kind of data.

As shown in FIG. 3, since the conventional back-end chip 130 is designed to be inputted with a vertical synchronous signal (V_sync2) for a following frame and/or image data while processing the encoding for one frame, there has been much possibility of causing an error during the image data encoding.

In this case, the back-end chip 130 sometimes encodes not only the frame that is currently being processed but also the next frame, not completing the encoding of correct data.

Besides, when the encoding unit of the back-end chip 130 transfers encoded data to the decoding unit or stores the encoded data in the memory, the encoded data for the current frame is sometimes not inputted correctly after a new vertical synchronous signal (V_sync2) is received.

SUMMARY

In order to solve the problems described above, the present invention provides a method of delayed transferring a vertical synchronous signal and an image signal processor for performing the method thereof that can increase the process efficiency of the back-end chip.

The present invention also provides a method of delayed transferring a vertical synchronous signal and an image signal processor for performing the method thereof that can have the vertical synchronous signal outputted (i.e. have the input of a new frame recognized) at an optimal point when transferring data encoded by the encoder to a receiving part (e.g. a back-end chip or a baseband chip).

Moreover, the present invention provides a method of delayed transferring a vertical synchronous signal and an image signal processor for performing the method thereof in which the input of processed data for the current frame is not interfered by the input of the vertical synchronous signal indicating the input of a new frame when encoded data is received in the receiving part.

The present invention also provides a method of delayed transferring a vertical synchronous signal and an image signal processor for performing the method thereof that can make the hardware design and control easier by using a general interface structure when the image signal processor provides encoded data to the back-end chip.

The present invention also provides a method of delayed transferring a vertical synchronous signal and an image signal processor for performing the method thereof that can perform a smooth encoding operation by allowing the image signal processor to determine, in accordance with the encoding speed, whether the inputted frame is to be encoded.

Other objects of the present invention will become apparent through the preferred embodiments described below.

To achieve the above objects, an aspect of the present invention features an image signal processor and/or an imaging device having the image signal processor.

According to an embodiment of the present invention, the imaging device has an image sensor, which outputs an electrical signal corresponding to an external image, a sub-ISP (Image Signal Processor), which executes a pre-process corresponding to any one of filtering and interpolation of the electrical signal, an encoding unit, which generates encoded image data by encoding in accordance with the pre-processed electrical signal, and a data output unit, which outputs the encoded image data to a receiving part. The sub-ISP can output to the image sensor a defer control command for expanding an output section of a vertical synchronous signal corresponding to a $(k+1)^{th}$ frame following a $k^{th}$ frame to be processed after an input of a capture command, k being a natural number, and the image sensor can expand and output the output section of the vertical synchronous signal in accordance with the defer control command.

An end point of the output section of the vertical synchronous signal outputted from the image sensor can coincide with or be outputted following a point at which encoding of the $k^{th}$ frame is completed by the encoding unit, and the end point can be either a falling edge or a rising edge.

Once the data output unit detects and notifies to the sub-ISP that encoding of the $k^{th}$ frame is completed, the sub-ISP can output a return control command to the image sensor. The return control command can reset to a default the length of an output section of a vertical synchronous signal corresponding to a $(k+2)^{th}$ frame, and can readjust a gain value to a default.

The encoded image data outputted for the $k^{th}$ frame can be between "START MARKER" and "STOP MARKER".

The data output unit can comprise a register outputting encoded image data inputted from the encoding unit by delaying the output by a predetermined clock.

The data output unit can comprise an H_sync generator, which generates and outputs a valid data enable signal of high or low state in accordance with a valid data enable control command, a delay unit, which outputs in accordance with a data output control command valid data inputted from the encoding unit as well as invalid data or pre-generated dummy data, and a transmission control unit, which generates and outputs the valid data enable control command and the data output control command.

The valid data enable signal can be interpreted as a write enable signal in the receiving part.

According to another embodiment of the present invention, the image signal processor can have a pre-process unit, which executes a pre-process corresponding to any one of filtering and interpolation of an electrical signal corresponding to an external image inputted from an image sensor, and outputs to the image sensor a defer control command for expanding an output section of a vertical synchronous signal corresponding to a $(k+1)^{th}$ frame following a $k^{th}$ frame to be processed after an input of a capture command, k being a natural number, an encoding unit, which generates encoded image data by encoding in accordance with the pre-processed electrical signal, and a data output unit, which outputs the encoded image data to a receiving part. The image sensor can expand and output the output section of the vertical synchronous signal corresponding to the $(k+1)^{th}$ frame in accordance with the defer control command.

An end point of the output section of the vertical synchronous signal outputted from the image sensor can coincide with or follow a point at which encoding of the $k^{th}$ frame is completed by the encoding unit, and the end point can be either a falling edge or a rising edge.

Once the data output unit detects and notifies to the pre-process unit that encoding of the $k^{th}$ frame is completed, the preprocess unit can output a return control command to the image sensor. The return control command can reset to a default the length of an output section of a vertical synchronous signal corresponding to a $(k+2)^{th}$ frame, and can readjust a gain value to a default.

The encoded image data outputted for the $k^{th}$ frame can be between "START MARKER" and "STOP MARKER".

The data output unit can comprise a register outputting encoded image data inputted from the encoding unit by delaying the output by a predetermined clock.

The data output unit can comprise an H_sync generator, which generates and outputs a valid data enable signal of high or low state in accordance with a valid data enable control command, a delay unit, which outputs in accordance with a data output control command valid data inputted from the encoding unit as well as invalid data or pre-generated dummy data, and a transmission control unit, which generates and outputs the valid data enable control command and the data output control command.

The valid data enable signal can be interpreted as a write enable signal in the receiving part.

In order to achieve the above objects, another aspect of the present invention features a method of transferring a deferred vertical synchronous signal executed in an image signal processor and/or a recorded medium recording a program for executing the method thereof.

According to an embodiment of the present invention, the method of transferring a deferred vertical synchronous signal executed in an image signal processor of an imaging device comprising an image sensor, can comprise the steps of being inputted with a capture command, being inputted with a vertical synchronous signal for a $k^{th}$ frame from an encoding unit, k being a natural number, transmitting a defer control command for a $(k+1)^{th}$ frame to the image sensor, and transmitting a return control command to the image sensor if encoding of the $k^{th}$ frame is completed. The image sensor can expand and output an output section of a vertical synchronous signal corresponding to a $(k+1)^{th}$ frame in accordance with the defer control command, and can readjust the length of an output section and a gain value of a vertical synchronous signal corresponding to a $(k+2)^{th}$ frame in accordance with the return control command.

An end point of the output section of the vertical synchronous signal outputted from the image sensor can coincide with or be outputted following a point at which encoding of the $k^{th}$ frame is completed, and the end point can be either a falling edge or a rising edge.

Completion of encoding the $k^{th}$ frame can be determined by using header information and tail information of encoded data.

DETAILED DESCRIPTION

The above objects, features and advantages wilt become more apparent through the below description with reference to the accompanying drawings.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the spirit and scope of the present invention. Throughout the drawings, similar elements are given similar reference numerals. Throughout the description of the present invention, when describing a certain technology is determined to evade the point of the present invention, the pertinent detailed description will be omitted.

Terms such as "first" and "second" can be used in describing various elements, but the above elements shall not be restricted to the above terms. The above terms are used only to distinguish one element from the other. For instance, the first element can be named the second element, and vice versa, without departing the scope of claims of the present invention. The term "and/or" shall include the combination of a plurality of listed items or any of the plurality of listed items.

When one element is described as being "connected" or "accessed" to another element, it shall be construed as being connected or accessed to the other element directly but also as possibly having another element in between. On the other hand, if one element is described as being "directly connected" or "directly accessed" to another element, it shall be construed that there is no other element in between.

The terms used in the description are intended to describe certain embodiments only, and shall by no means restrict the present invention. Unless clearly used otherwise, expressions in the singular number include a plural meaning. In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

Unless otherwise defined, all terms, including technical terms and scientific terms, used herein have the same meaning as how they are generally understood by those of ordinary skill in the art to which the invention pertains. Any term that is defined in a general dictionary shall be construed to have the same meaning in the context of the relevant art, and, unless otherwise defined explicitly, shall not be interpreted to have an idealistic or excessively formalistic meaning.

Hereinafter, preferred embodiments will be described in detail with reference to the accompanying drawings. Identical or corresponding elements will be given the same reference numerals, regardless of the figure number, and any redundant description of the identical or corresponding elements will not be repeated.

In describing the embodiments of the present invention, the process operation of the image signal processor, which is the core subject of the invention, will be described. However, it shall be evident that the scope of the present invention is by no means restricted by what is described herein.

Figure 4:
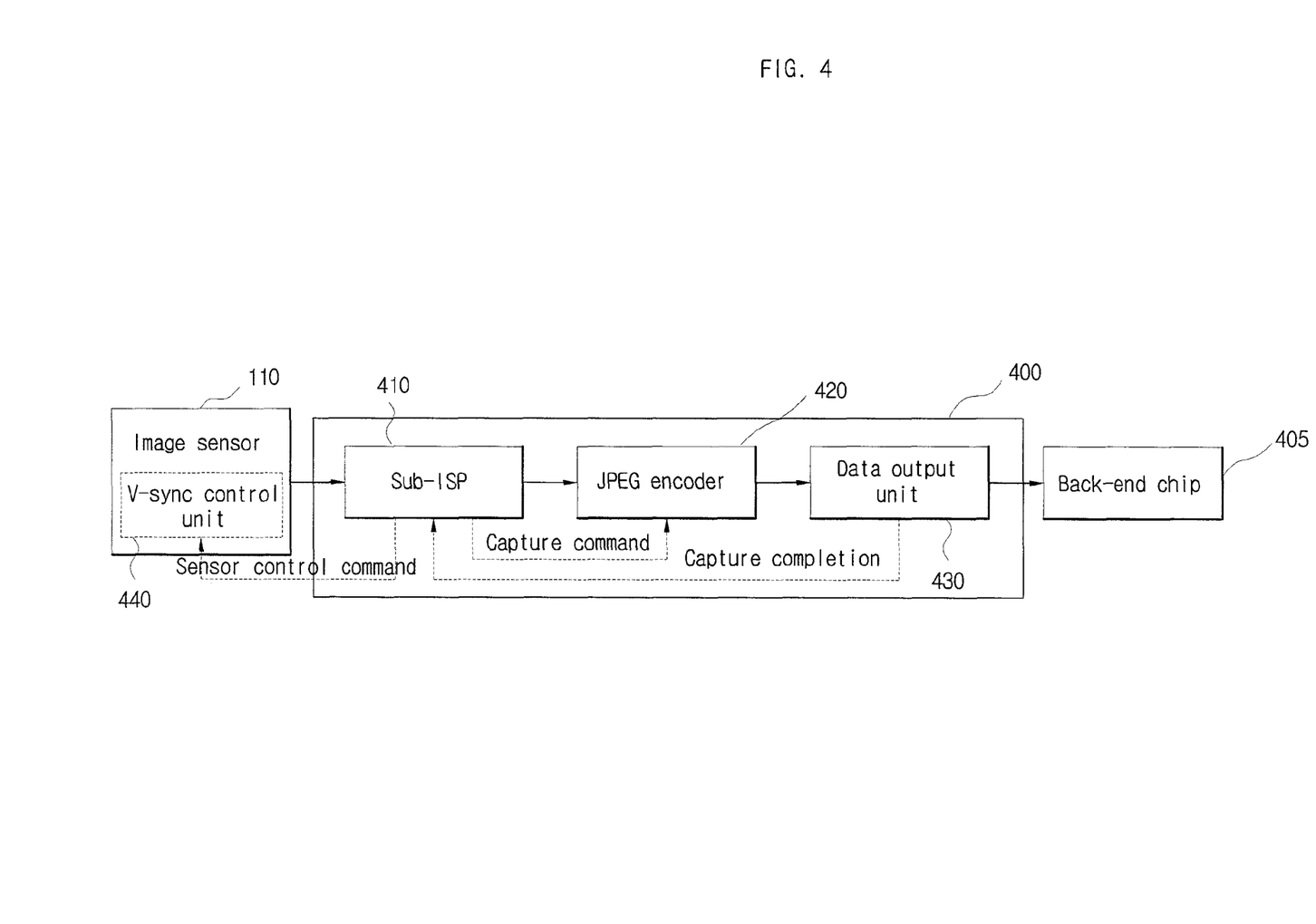
FIG. 4 shows the block diagram of an imaging device in accordance with an embodiment of the present invention.
Figure 5:
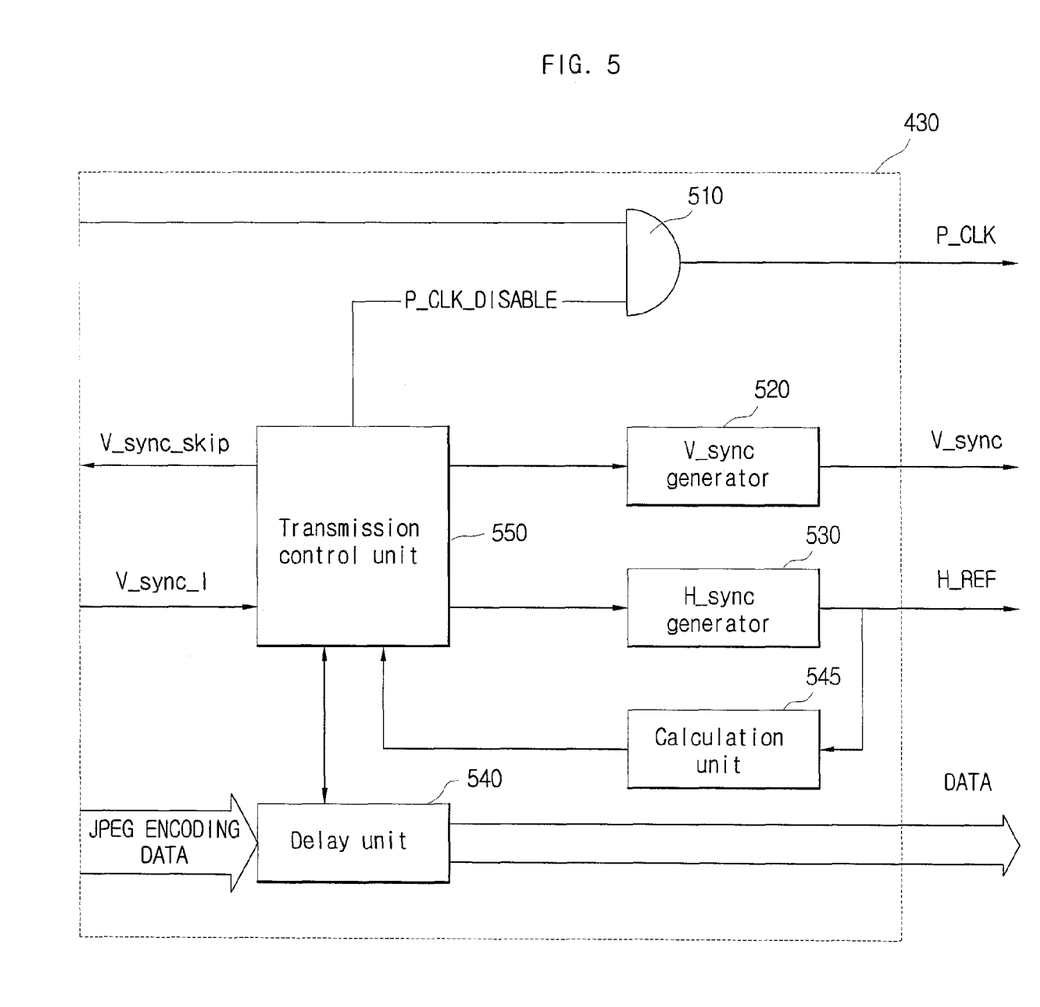
FIG. 5 shows the block diagram of a data output unit in accordance with an embodiment of the present invention.

FIG. 4 shows the block diagram of an imaging device in accordance with an embodiment of the present invention; FIG. 5 shows the block diagram of a data output unit in accordance with an embodiment of the present invention; and FIG. 6 and FIG. 7 show signal types for which each element outputs encoded data in accordance with an embodiment of the present invention.

As shown in FIG. 4, the imaging device of the present invention comprises an image sensor 110, an image signal processor 400 and a back-end chip 405. Although it is evident that the imaging device can further comprise a display unit 150, a memory, a baseband chip 140 and a key input unit, these elements are somewhat irrelevant to the present invention and hence will not be described herein.

The image sensor 110 comprises a V_sync control unit 440. Once a sensor control command is inputted from a sub-image signal processor 410, the V_sync control unit 440 controls the length of a vertical synchronous signal (V_sync) section of a frame to correspond to the sensor control command.

Figure 6:
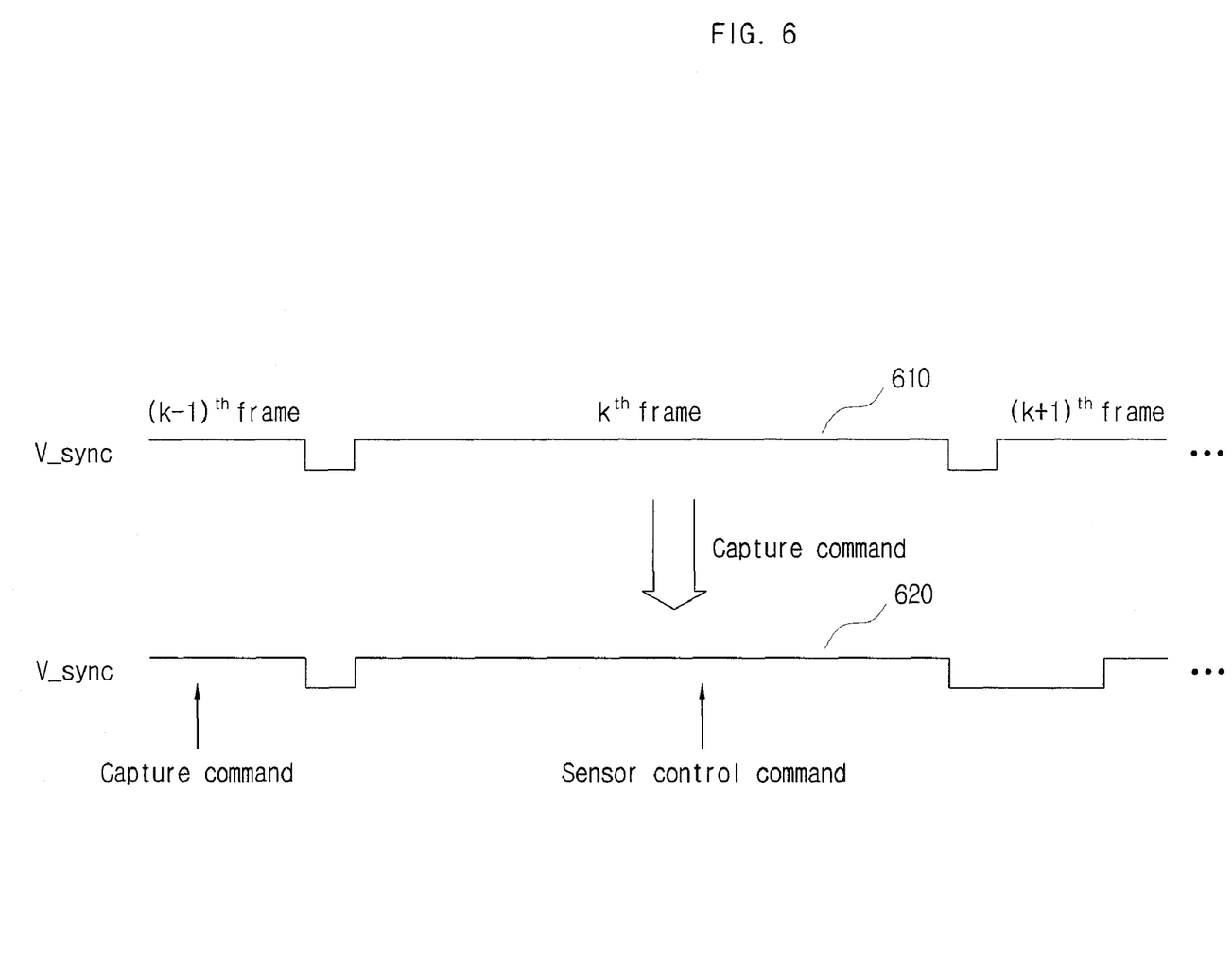
FIG. 6 and FIG. 7 show signal types for which each element outputs encoded data in accordance with an embodiment of the present invention.
Figure 7:
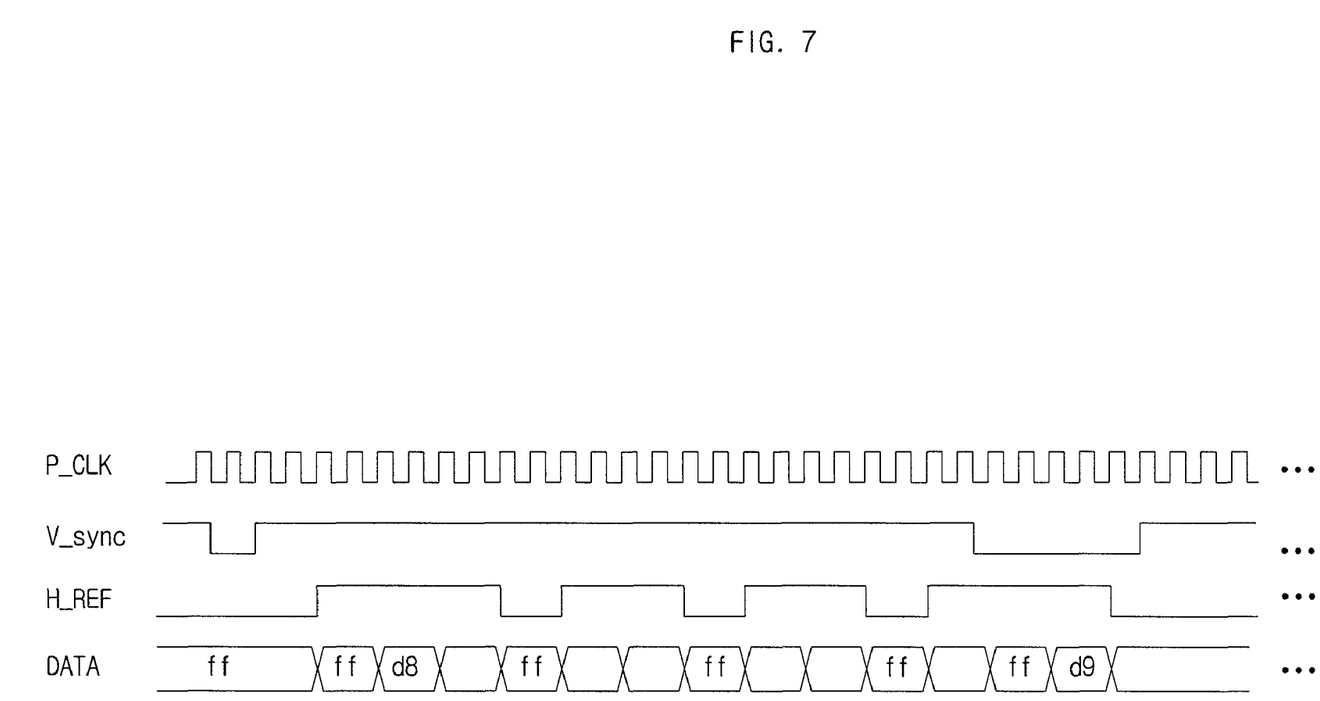

For example, as shown in FIG. 6, if a defer control command is inputted from the sub-ISP 410 while raw data for the $k^{th}$ frame is outputted, whereas k is a natural number, the image sensor 110 controls a deferred V_sync signal to be outputted for the $(k+1)^{th}$ frame. That is, considering that the sub-ISP 410 of the present invention detects a rising edge of the V_sync signal to sense the input of an electrical signal for a new frame, the point on which the rising edge occurs is being delayed. The delay time of a rising edge can be predetermined, for example, any duration for which 8 to 24 lines of data are processed.

Then, once a return control command is inputted from the sub-ISP 410, the section in which the V_sync signal is outputted after the return control command is restored to the default length, and the gain is readjusted to a predetermined value. The return control command can be inputted from the sub-ISP 410 when the frame corresponding to an inputted capture command (e.g. photographing an image) is completely processed. The gain is readjusted to the default value to maintain proper brightness by adjusting the gain to be relatively lower because extending the sensor integration time, which is the exposure time, by extending the output section of the V_sync signal increases the brightness. An irregular increase of the gain may adversely affect the inputted image that follows.

The image signal processor 400 comprises the sub-ISP 410, a JPEG encoder 420 and a data output unit 430. The image signal processor 400 can of course further comprise a clock generator for internal operation.

The sub-ISP 410 can further perform not only a function as a conventional image signal processor but also an additional function (e.g. sensor control command output, capture command output, capture completion information input, etc.) described herein.

Specifically, the sub-ISP 410 can perform pre-process steps for the process of the JPEG encoder 420. Since the sub-ISP 410 performs the pre-process steps, sub-ISP 410 may be referred to as a pre-process unit for the sake of convenience in this description. The sub-ISP 410 can be inputted with the electrical signal type of raw data per line from the image sensor 110 for each frame and process the raw data before transferring the raw data to the JPEG encoder 420.

The pre-process steps can comprise at least one of the steps consisting of color space transformation, filtering and color subsampling.

The color space transformation transforms an RGB color space to a YUV (or YIQ) color space. This is to reduce the amount of information without recognizing the difference in picture quality.

The filtering is a step of smoothing the image using a low-pass filter in order to increase the compression ratio.

The color subsampling subsamples the chrominance signal component by using all of the Y value, some of other values and none of the remaining values.

If a capture command (e.g. a command to photograph an image) is inputted from the back-end chip 405 or a baseband chip 140, the sub-ISP 410 outputs a sensor control command (i.e. a defer control command) to the V_sync control unit 440 of the image sensor 110 and the capture command to the JPEG encoder 420, in order to expand the length of output section of a vertical synchronous signal (V_sync signal) outputted from the image sensor 110 for the immediately following frame. It shall be evident to anyone skilled in the art that the vertical synchronous signal means the start of input of each frame.

By the defer control command, the V_sync control unit 440 expands the output section of the V_sync signal to be outputted immediately afterward, and outputs the V_sync signal. By the capture command, the JPEG encoder 420 processes the image data of the corresponding frame. The process of the JPEG encoder 420 in accordance with the capture command is identical to the conventional process in accordance with a photographing command. Therefore, the process of outputting the capture command to the JPEG encoder 420 can be skipped.

Then, upon recognizing that encoding of the frame has been completed as the JPEG encoded data including "STOP MARKER" is inputted from the JPEG encoder 420, the data output unit 430 outputs the capture completion information to the sub-ISP 410.

Then, the sub-ISP 410 controls the length of the output section of V_sync signal and adjusts the gain by outputting the return control command to the V_sync control unit 440.

The JPEG encoder 420 compresses the pre-processed raw data, as in the method described earlier, and generates JPEG encoded data.

The JPEG encoder 420 can comprise a memory for temporarily storing the processed raw data inputted from the sub-ISP 410 to divide the raw data into predetermined block units (e.g. 8×8) for encoding. The JPEG encoder 420 can further comprise an output memory, which temporarily stores JPEG encoded data prior to outputting the JPEG encoded data to the data output unit 430. The output memory can be, for example, a FIFO. In other words, the image signal processor 400 of the present invention can also encode image data, unlike the conventional image signal processor 120.

The data output unit 430 transfers the JPEG encoded data, generated by the JPEG encoder 420, to a receiving part (e.g. the back-end chip 405, the baseband chip 140, or the camera control processor, hereinafter referred to as "back-end chip" 405). The data output unit 430 can comprise, for example, a register for delaying the data inputted from the JPEG encoder 420 for predetermined duration (e.g. 2-3 clocks) before outputting the data.

The data output unit 430 monitors whether the encoded data inputted from the JPEG encoder 420 includes "STOP MARKER", and transfers the capture completion information to the sub-ISP 410 in case "STOP MARKER" is included.

If a command to, for example, capture a picture is received from the baseband chip 140, which controls the general operation of the portable terminal, the back-end chip 405 transmits a capture command to the sub-ISP 410. The back-end chip 405 also receives and stores in a memory (not shown) the picture-improved JPEG encoded data inputted from the image signal processor 400, and decodes the stored encoded data to be displayed on the display unit 150, or has the baseband chip 140 read and process the stored encoded data from the memory.

The detailed structure of the data output unit 430 is illustrated in FIG. 5.

Referring to FIG. 5, the data output unit 430 can comprise an AND gate 510, an H_sync generator 530, the delay unit 540, and a transmission control unit 550.

The data output unit 430 in accordance with the present invention may not include a separate V_sync generator because it is possible to output V_sync inputted from a preceding element (e.g. the JPEG encoder 420).

The AND gate 510 outputs a clock signal (P_CLK) to the back-end chip 405 only if every input is inputted with a signal. That is, by receiving the clock signal from a clock generator (not shown), disposed in the image signal processor 400, and receiving a clock control signal from the transmission control unit 550, the AND gate 510 outputs the clock signal to the back-end chip 405 only when the clock control signal instructs the output of the clock signal. The clock control signal can be a high signal or a low signal, each of which can be recognized as a P_CLK enable signal or a P_CLK disable signal. Of course, the reverse case is possible. In this case, the section in which P_CLK is outputted to the back-end chip 405 can be made to coincide with a section in which valid data is outputted among the JPEG encoded data. It shall be evident to anyone of ordinary skill in the art that the output signal of the AND gate 510 can be controlled because the transmission control unit 550 can identify whether the encoded data to be currently outputted is valid data or invalid data. If the clock signal is set to be always outputted to the back-end chip 405, the illustrated AND gate 510 may be omitted.

The H_sync generator 530 generates and outputs a valid data enable signal (H_REF) by the control of the transmission control unit 550 (i.e. until an output termination command of H_REF is inputted after an output command of H_REF is inputted). The high section (or a low section, depending on the design method) of the valid data enable signal coincides with the output section in which the JPEG encoded data on one frame is outputted from the delay unit 540. It shall be evident to anyone of ordinary skill in the art that the output signal of the H_sync generator 530 can be controlled because the transmission control unit 550 can identify whether the encoded data to be currently outputted is valid data or invalid data.

The delay unit 540 sequentially outputs the data, inputted from the JPEG encoder 420, to the back-end chip 405. The delay unit 540 can comprise, for example, a register for delaying the data inputted from the JPEG encoder 420 for a predetermined duration (e.g. 2-3 clocks) before outputting the data. The section in which the delay unit 540 outputs valid data can coincide with the section in which the H_REF signal is outputted in a high state. As described earlier, it shall be evident that the section in which valid data are outputted can be designed to coincide with the section in which the H_REF signal is outputted in a low state.

The transmission control unit 550 can determine whether the JPEG encoded data stored temporarily in the delay unit is valid data, and in case the data to be currently outputted is not valid data (e.g. data containing ff or 0x00), the transmission control unit 550 can control the AND gate 510 not to have the clock signal be outputted to the back-end chip 405 and control the H_sync generator 530 not to have the H_REF signal in a low state be outputted.

Invalid data mentioned in this description refers to what is described in, for example, the JPEG standard as data that is not valid (i.e. data not actually forming an image), and is sometimes expressed as "ff". It shall be evident, however, to those of ordinary skill in the art that, in FIG. 7, "ff8" can be recognized as "SOI", which is a "START MARKER", and "ffd9" as "EOI", which is a "STOP MARKER".

The pre-stored or pre-designated dummy data (i.e. data only for meeting the format) can be outputted in the section in which invalid data are outputted. A multiplexer (MUX) can be also placed before the delay unit, through which the JPEG encoded data and dummy data are outputted, and the delay unit 540 receives these JPEG encoded data and dummy data to output. In this case, the transmission control unit 550 can input a dummy data output command to the MUX if the transmission control unit 550 determines that the inputted JPEG encoded data is invalid data. The MUX shall then be able to have pre-designated dummy data input to the delay unit 540 and output to the back-end chip 405.

The transmission control unit 550 can recognize the information on the start and end of JPEG encoding by capturing "START MARKER" and "STOP MARKER" from the header and tail of the JPEG encoded data that the delay unit 540 sequentially receives from the JPEG encoder 430 and temporarily stores for outputting valid data. Through this, it becomes possible to recognize whether one frame is completely encoded and/or outputted by the JPEG encoder 420.

FIG. 6 and FIG. 7 show the types of signal outputted by each element. FIG. 6 shows the signal type of a case in which the image sensor 110 expands the length of the output section of the V_sync signal in accordance with a defer control command, and FIG. 7 shows the signal type outputted from the data output unit 430.

As shown in FIG. 6, the image sensor 110 outputs the V_sync signal, as well as the corresponding raw data, in accordance with a predetermined interval. That is, the output state such as 610 will be maintained in a preview state (i.e. the electrical signal inputted from the image sensor 110, regardless of photographing an image, is encoded and decoded to be displayed on the display unit 150) prior to photographing the image. However, if a capture command is inputted by the user while the $(k+1)^{th}$ frame is being processed, a sensor control command (i.e. a defer control command) is inputted from the sub-ISP 410 while the $k^{th}$ frame is being processed, and the length of the output section of the V_sync signal, which is outputted immediately after that, is expanded. Since the present description assumes that the input of a new frame by the V_sync signal is detected by the presence of a rising edge, it can be inferred that the point of detecting a rising edge is expanded, compared to the related art, when 610 and 620 are compared. Once the photographing of the $k^{th}$ frame is completed, the preview state is maintained again from the $(k+1)^{th}$ frame.

As the length of the output section of the V_sync signal is expanded through the above steps, the point of getting the rising edge of the V_sync signal detected is made to be the point or after the point at which the process of the corresponding frame is completed.

The data output unit 430 of the present invention can solve the problem of getting normal data communication interfered by the V_sync signal for the $(k+1)^{th}$ frame white the $k^{th}$ frame is processed, through the steps described above.

At this time, the data output unit 430 can maintain the H_REF signal high only when the outputted encoded data is valid data, and can have the clock signal outputted to the back-end chip 405 in the corresponding section only. As such, while invalid encoded data or dummy data is being outputted, the clock signal (P_CLK) to be outputted to the back-end chip 405 is turned off, and hence any unnecessary operation can be minimized, minimizing the power consumption of the back-end chip 405.

The conventional back-end chip 405 is embodied to receive the YUV/Bayer format of data, and uses the P_CLK, V_sync, H_REF and DATA signals as the interface for receiving these data.

Considering this, the image signal processor 400 of the present invention is embodied to use the same interface as the conventional image signal processor.

Therefore, it shall be evident that the back-end chip 405 of the present invention can be port-matched although the back-end chip 405 is embodied through the conventional method of designing back-end chip.

For example, if the operation of a typical back-end chip 405 can be said to be initialized from an interrupt of the rising edge of the V_sync signal, the interfacing between the chips is possible, similar to outputting the conventional V_sync signal, in the present invention by inputting the corresponding signal to the back-end chip 405, since the conventional interface structure is identically applied to the present invention.

Likewise, considering that the typical back-end chip 405 must generate the V_sync rising interrupt and that the valid data enable signal (H_REF) is used as a write enable signal of the memory when data is received from the image signal processor 400, the power consumption of the back-end chip 405 can be reduced by using the signal output method of the present invention.

Hitherto, although the image signal processor 400 using the JPEG encoding method has been described, it shall be evident that the same data transmission method can be used for other encoding methods, such as the BMP encoding method, MPEG (MPEG 1/2/4 and MPEG-4 AVC) encoding and TV-out method.

As described above, the present invention can increase the process efficiency and reduce power consumption of the back-end chip.

The present invention can also have the vertical synchronous signal outputted (e.g. recognize the input of a new frame) at an optimal point when transferring data encoded by the encoder to a receiving part (e.g. a back-end chip or a baseband chip).

Moreover, with the present invention, the input of processed data for the current frame is not interfered by the input of the vertical synchronous signal indicating the input of a new frame when encoded data is received in the receiving part.

Moreover, the present invention can make the hardware design and control easier by using a general interface structure when the image signal processor provides encoded data to the back-end chip.

Furthermore, the present invention enables a smooth encoding operation by allowing the image signal processor to determine, in accordance with the encoding speed, whether the inputted frame is to be encoded.

The drawings and detailed description are only examples of the present invention, serve only for describing the present invention and by no means limit or restrict the spirit and scope of the present invention. Thus, any person of ordinary skill in the art shall understand that a large number of permutations and other equivalent embodiments are possible. The true scope of the present invention must be defined only by the spirit of the appended claims.

What is claimed is:

1. An imaging device comprising:
    an image sensor, outputting an electrical signal corresponding to an external image;
    a sub-ISP (Image Signal Processor), executing a pre-process corresponding to any one of filtering and interpolation of the electrical signal;
    an encoding unit, generating encoded image data by encoding in accordance with the pre-processed electrical signal; and
    a data output unit, outputting the encoded image data to a receiving part,
    whereas the sub-ISP outputs to the image sensor a defer control command for expanding an output section of a vertical synchronous signal corresponding to a $(k+1)^{th}$ frame following a $k^{th}$ frame to be processed after an input of a capture command, k being a natural number, and the image sensor expands the output section of the vertical synchronous signal and outputs the vertical synchronous signal in accordance with the defer control command.

2. The imaging device of claim 1, wherein an end point of the output section of the vertical synchronous signal outputted from the image sensor coincides with or is outputted following a point at which encoding of the $k^{th}$ frame is completed by the encoding unit, and the end point is either a falling edge or a rising edge.

3. The imaging device of claim 1, wherein, once the data output unit detects and notifies to the sub-ISP that encoding of the $k^{th}$ frame is completed, the sub-ISP outputs a return control command to the image sensor,
    whereas the return control command resets to a default a length of an output section of a vertical synchronous signal corresponding to a $(k+2)^{th}$ frame, and readjusts a gain value to a default.

4. The imaging device of claim 1, wherein the encoded image data outputted for the $k^{th}$ frame is between "START MARKER" and "STOP MARKER".

5. The imaging device of claim 1, wherein the data output unit comprises a register outputting encoded image data inputted from the encoding unit by delaying the output by a predetermined clock.

6. The imaging device of claim 1, wherein the data output unit comprises:
    an H_sync generator, generating and outputting a valid data enable signal of high or low state in accordance with a valid data enable control command;
    a delay unit, outputting in accordance with a data output control command valid data inputted from the encoding unit as well as invalid data or pre-generated dummy data; and
    a transmission control unit, generating and outputting the valid data enable control command and the data output control command.

7. The imaging device of claim 6, wherein the valid data enable signal is interpreted as a write enable signal in the receiving part.

8. An image signal processor, comprising:
    a pre-process unit, executing a pre-process corresponding to any one of filtering and interpolation of an electrical signal corresponding to an external image inputted from an image sensor, and outputting to the image sensor a defer control command for expanding an output section of a vertical synchronous signal corresponding to a $(k+1)^{th}$ frame following a $k^{th}$ frame to be processed after an input of a capture command, k being a natural number;
    an encoding unit, generating encoded image data by encoding in accordance with the pre-processed electrical signal; and
    a data output unit, outputting the encoded image data to a receiving part,
    whereas the image sensor expands the output section of the vertical synchronous signal corresponding to the $(k+1)^{th}$ frame and outputs the vertical synchronous signal in accordance with the defer control command.

9. The image signal processor of claim 8, wherein an end point of the output section of the vertical synchronous signal outputted from the image sensor coincides with or follows a point at which encoding of the $k^{th}$ frame is completed by the encoding unit, and the end point is either a falling edge or a rising edge.

10. The image signal processor of claim 8, wherein, once the data output unit detects and notifies to the pre-process unit that encoding of the $k^{th}$ frame is completed, the pre-process unit outputs a return control command to the image sensor,
    whereas the return control command resets to a default a length of an output section of a vertical synchronous signal corresponding to a $(k+2)^{th}$ frame, and readjusts a gain value to a default.

11. The image signal processor of claim 8, wherein the encoded image data outputted for the $k^{th}$ frame is between "START MARKER" and "STOP MARKER".

12. The image signal processor of claim 8, wherein the data output unit comprises a register outputting encoded image data inputted from the encoding unit by delaying the output by a predetermined clock.

13. The image signal processor of claim 8, wherein the data output unit comprises:
    an H_sync generator, generating and outputting a valid data enable signal of high or low state in accordance with a valid data enable control command;
    a delay unit, outputting in accordance with a data output control command valid data inputted from the encoding unit as well as invalid data or pre-generated dummy data; and
    a transmission control unit, generating and outputting the valid data enable control command and the data output control command.

14. The image signal processor of claim 13, wherein the valid data enable signal is interpreted as a write enable signal in the receiving part.

15. A method of transferring a deferred vertical synchronous signal, the method executed in an image signal processor of an imaging device comprising an image sensor, the method comprising:
   being inputted with a capture command;
   being inputted with a vertical synchronous signal for a $k^{th}$ frame from an encoding unit, k being a natural number;
   transmitting a defer control command for a $(k+1)^{th}$ frame to the image sensor; and
   transmitting a return control command to the image sensor if encoding of the $k^{th}$ frame is completed,
   whereas the image sensor expands an output section of a vertical synchronous signal corresponding to a $(k+1)^{th}$ frame and outputs the vertical synchronous signal in accordance with the defer control command, and readjusts a length of an output section and a gain value of a vertical synchronous signal corresponding to a $(k+2)^{th}$ frame in accordance with the return control command.

16. The method of claim 15, wherein an end point of the output section of the vertical synchronous signal outputted from the image sensor coincides with or is outputted following a point at which encoding of the $k^{th}$ frame is completed, and the end point is either a falling edge or a rising edge.

17. The method of claim 15, wherein completion of encoding the $k^{th}$ frame is determined by using header information and tail information of encoded data.

* * * * *